United States Patent
De Lima et al.

(10) Patent No.: US 11,216,011 B2
(45) Date of Patent: Jan. 4, 2022

(54) OPTIMIZED TRAJECTORY TO NOISE IMPROVEMENT WITH AUTO-TAKEOFF

(71) Applicant: Embraer S.A., São José dos Campos (BR)

(72) Inventors: Grace Rodrigues De Lima, São José dos Campos (BR); Patrice London Guedes, São José dos Campos (BR); Mario Triches Junior, São José dos Campos (BR); José Roberto Ferreira De Camargo Clark Reis, São José dos Campos (BR); Bernardo Bastos Zanetti, São José dos Campos (BR); Érica Satsuki Yoshimatsu, São José dos Campos (BR); Miriam Pittigliani, São José dos Campos (BR); Felipe Issamu Kitadani Odaguil, São José dos Campos (BR); Rubens Monteiro De Souza Junior, São José dos Campos (BR)

(73) Assignee: Embraer S.A., São José dos Campos-SP (BR)

( * ) Notice: Subject to any disclaimer, the term of this patent is extended or adjusted under 35 U.S.C. 154(b) by 774 days.

(21) Appl. No.: 15/924,127

(22) Filed: Mar. 16, 2018

(65) Prior Publication Data
US 2019/0286166 A1    Sep. 19, 2019

(51) Int. Cl.
*G05D 1/06* (2006.01)
*B64C 13/18* (2006.01)
(Continued)

(52) U.S. Cl.
CPC .......... *G05D 1/0661* (2013.01); *B64C 13/18* (2013.01); *B64D 31/06* (2013.01); *B64D 45/00* (2013.01); *G05D 1/0808* (2013.01); *G08G 5/00* (2013.01)

(58) Field of Classification Search
CPC ..... G05D 1/0661; G05D 1/0808; B64D 31/06
See application file for complete search history.

(56) References Cited

U.S. PATENT DOCUMENTS

| 2,322,225 A | 6/1943 | Crane et al. |
| 3,295,369 A | 1/1967 | Priestley |

(Continued)

FOREIGN PATENT DOCUMENTS

| EP | 0549014 A1 | 6/1993 |
| EP | 2135147 A2 | 12/2009 |

(Continued)

OTHER PUBLICATIONS

Extended European Search Report issued in European Application No. 19163198.5 dated Oct. 18, 2019 (8 pages).

*Primary Examiner* — Ian Jen
*Assistant Examiner* — Renee LaRose
(74) *Attorney, Agent, or Firm* — Nixon & Vanderhye P.C.

(57) ABSTRACT

Aircraft takeoff trajectory is automatically optimized to minimize Perceived Noise Level. A flight computer automatically performs all the actions to takeoff the airplane and assure that its real takeoff trajectory is compliant with the takeoff trajectory optimized. Variability of trajectory is eliminated through automation of pilot's actions during takeoff and assurance of an optimum trajectory. The system also provides for simultaneity of actions and the changing of aerodynamic configuration during takeoff.

12 Claims, 8 Drawing Sheets

Example Auto Takeoff System Diagram

(51) Int. Cl.
  *B64D 31/06*  (2006.01)
  *G05D 1/08*  (2006.01)
  *G08G 5/00*  (2006.01)
  *B64D 45/00*  (2006.01)

(56) References Cited

U.S. PATENT DOCUMENTS

| | | | |
|---|---|---|---|
| 4,019,702 A * | 4/1977 | Annin | G05D 1/0661 |
| | | | 244/182 |
| 9,578,686 B2 | 2/2017 | Apdalhaliem et al. | |
| 2005/0004723 A1 | 1/2005 | Duggan et al. | |
| 2013/0092791 A1 * | 4/2013 | Bakker | G05D 1/0653 |
| | | | 244/1 N |

FOREIGN PATENT DOCUMENTS

| | | |
|---|---|---|
| EP | 3021306 A1 | 5/2016 |
| GB | 2453854 A | 4/2009 |
| WO | 2008112530 A2 | 9/2008 |

* cited by examiner

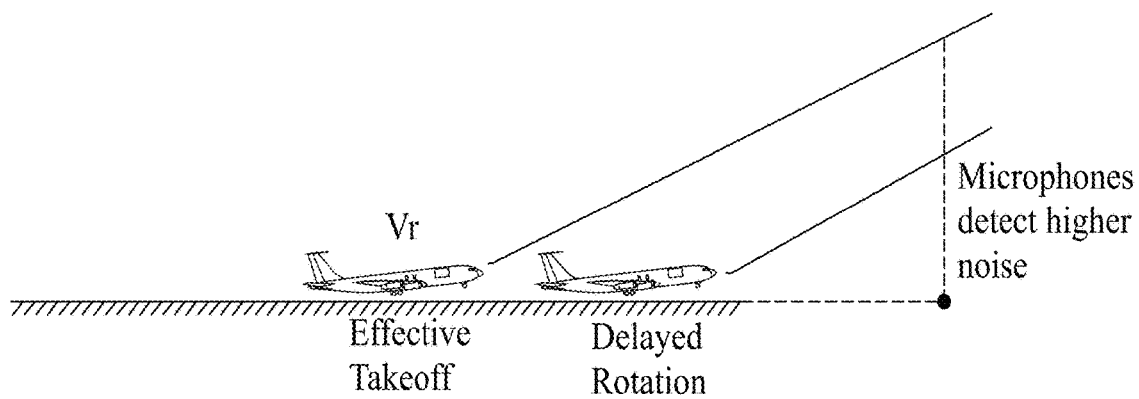
Figure 1: Delayed rotation effect
Figure 2: Takeoff Flightpaths of 190E1 fleet operating at LCY Airport.

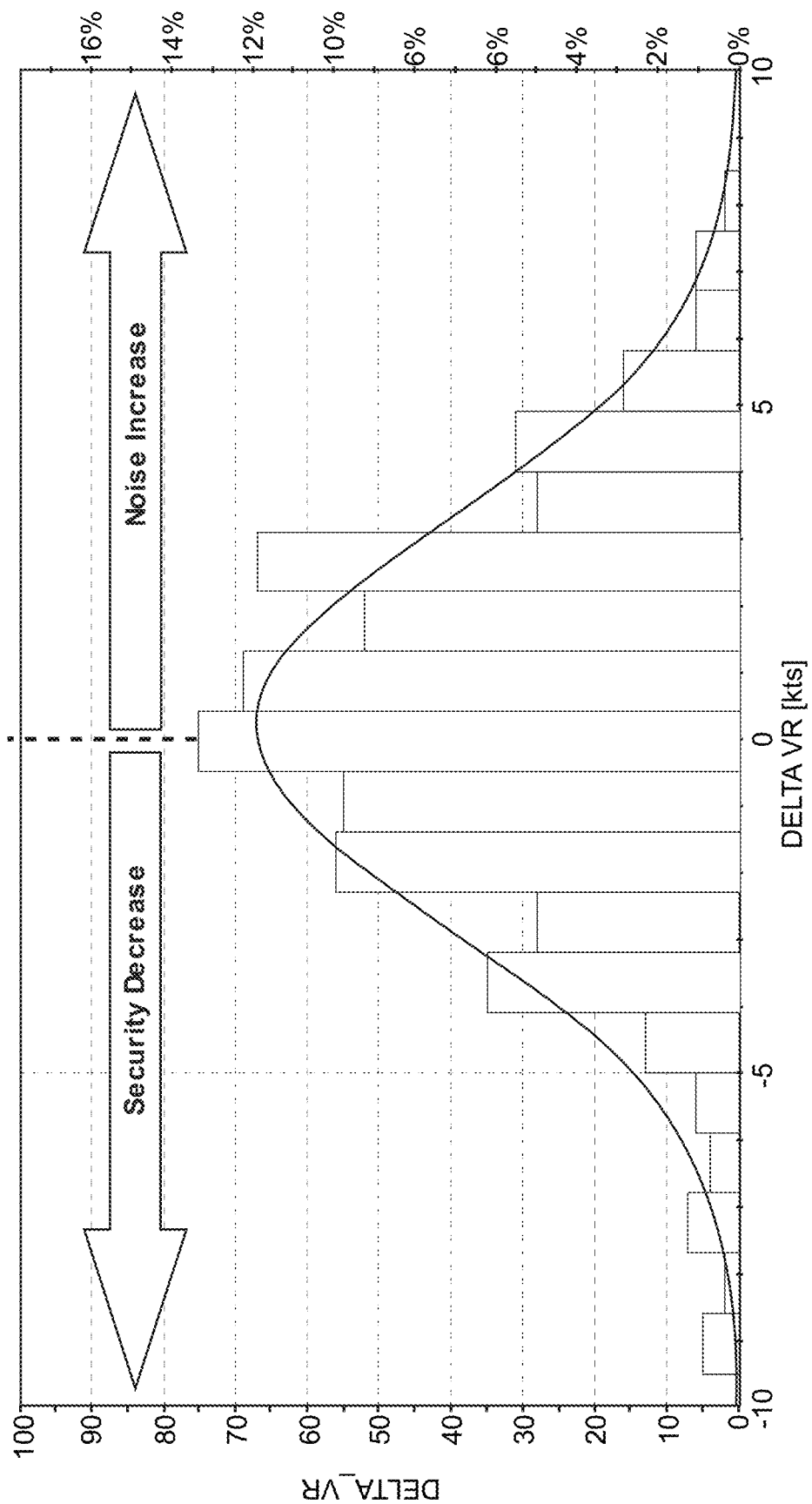
Figure 3a: Comparison between real data and optimum data of Vr

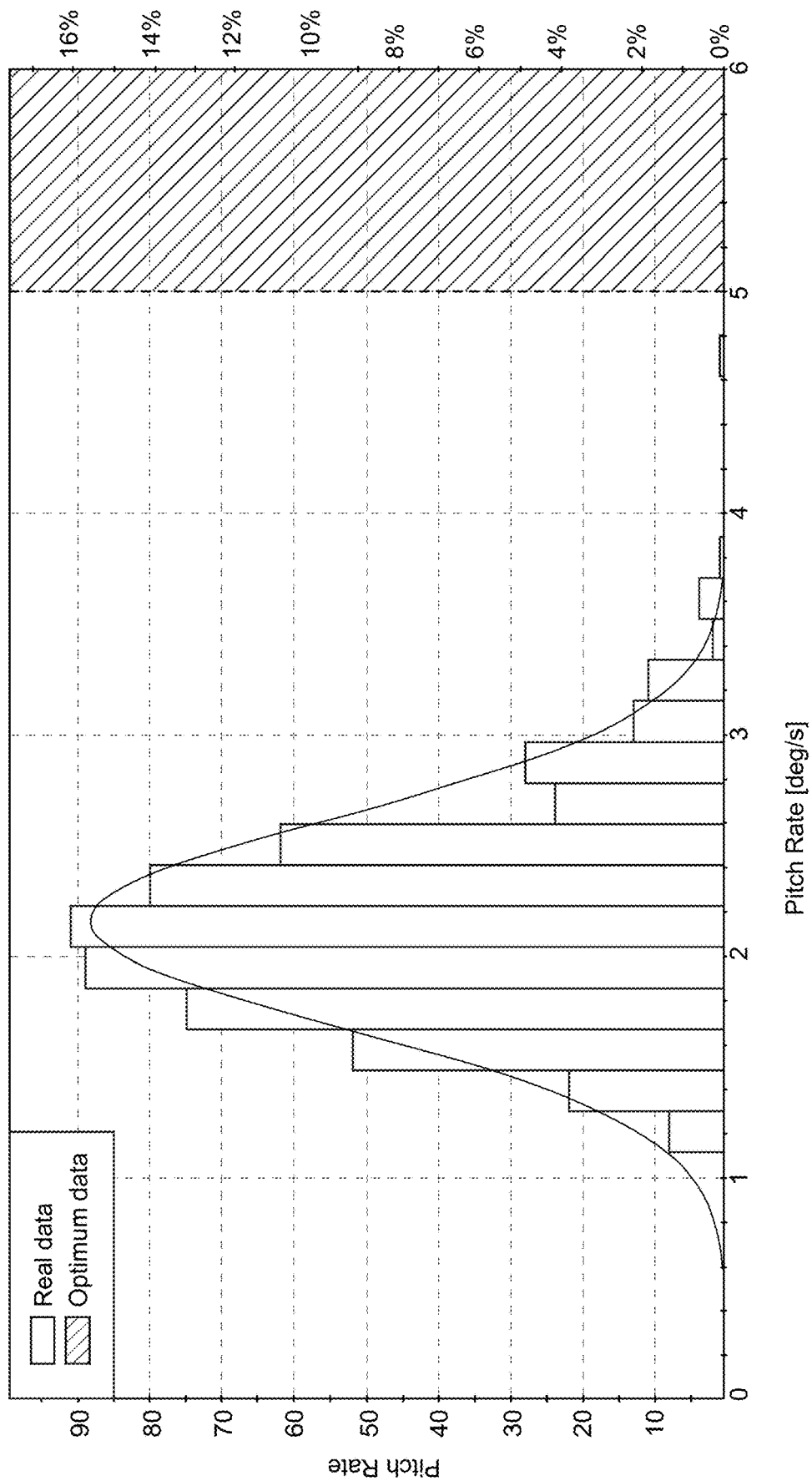
Figure 3b: Comparison between real data and optimum data of pitch rate

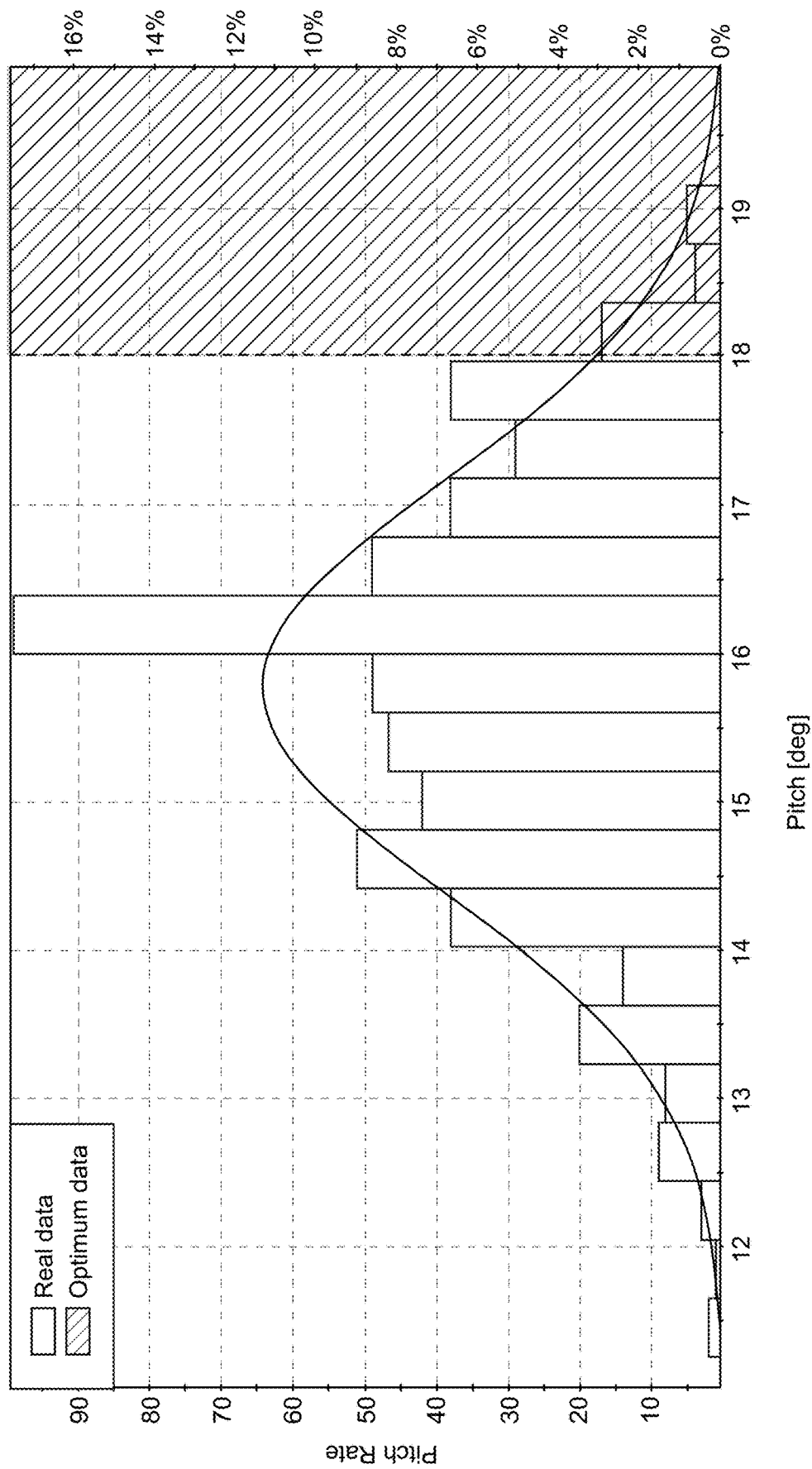
Figure 3C: Comparison between real data and optimum data of pitch

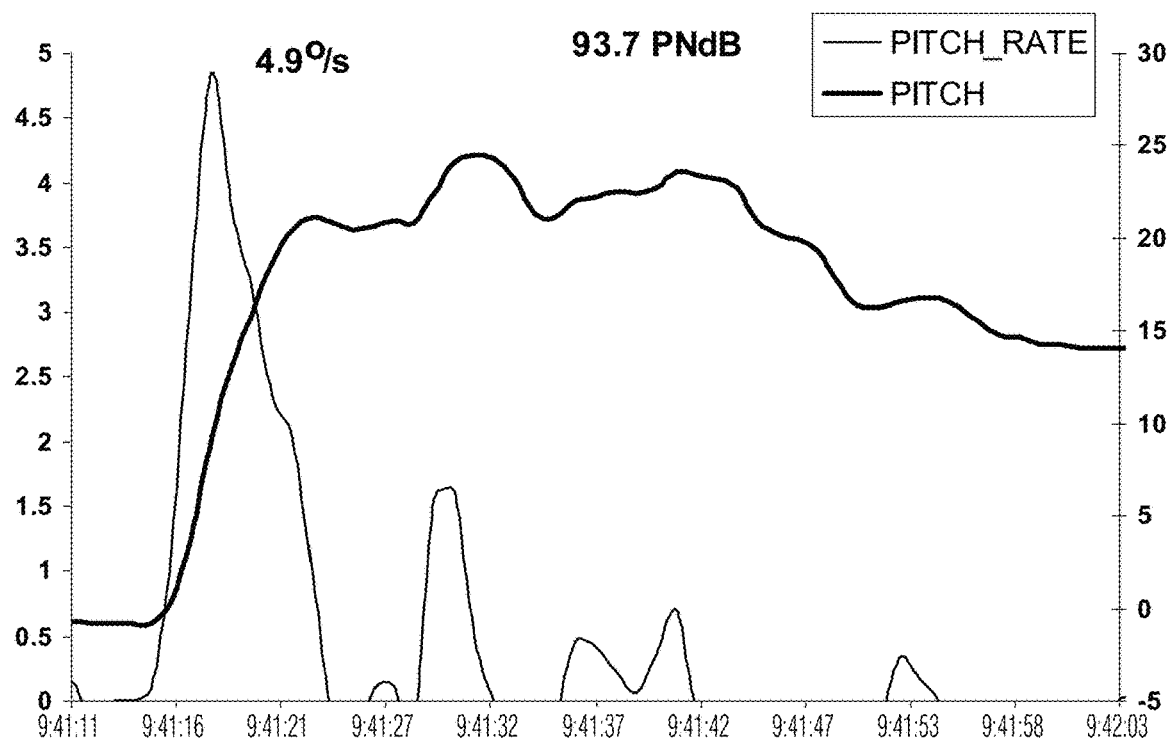
Figure 4a: Pitch Rate Effect in Perceived Noise Level.
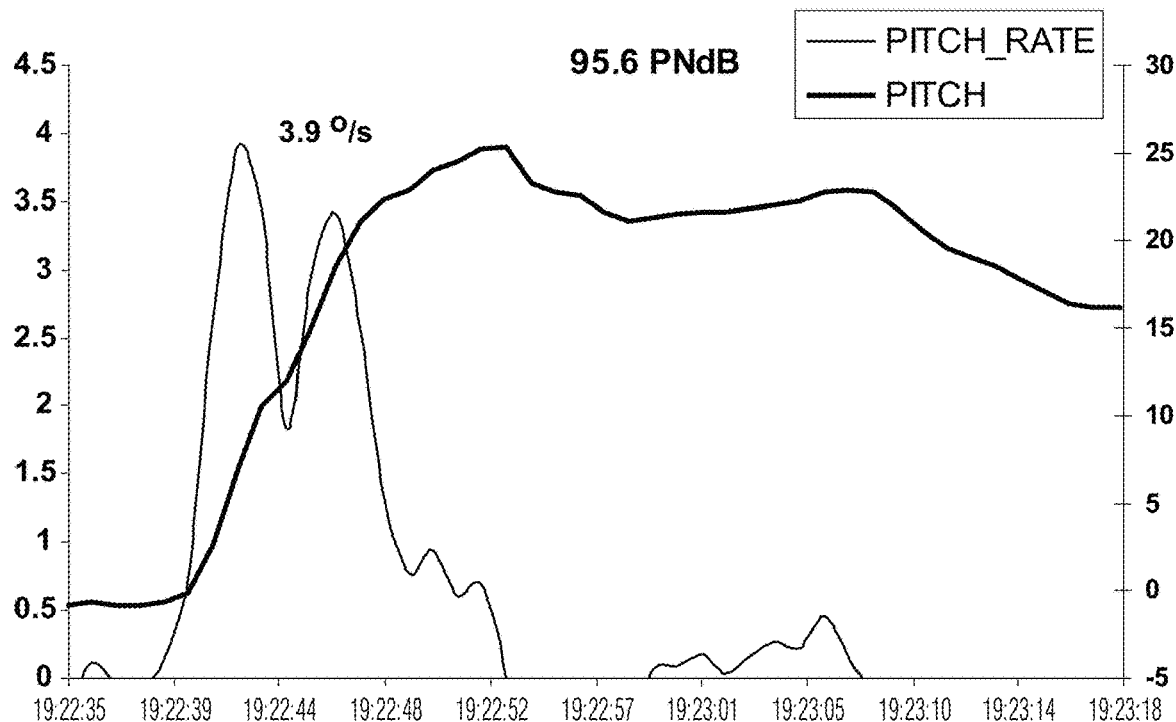
Figure 4b: Pitch Rate Effect in Perceived Noise Level.

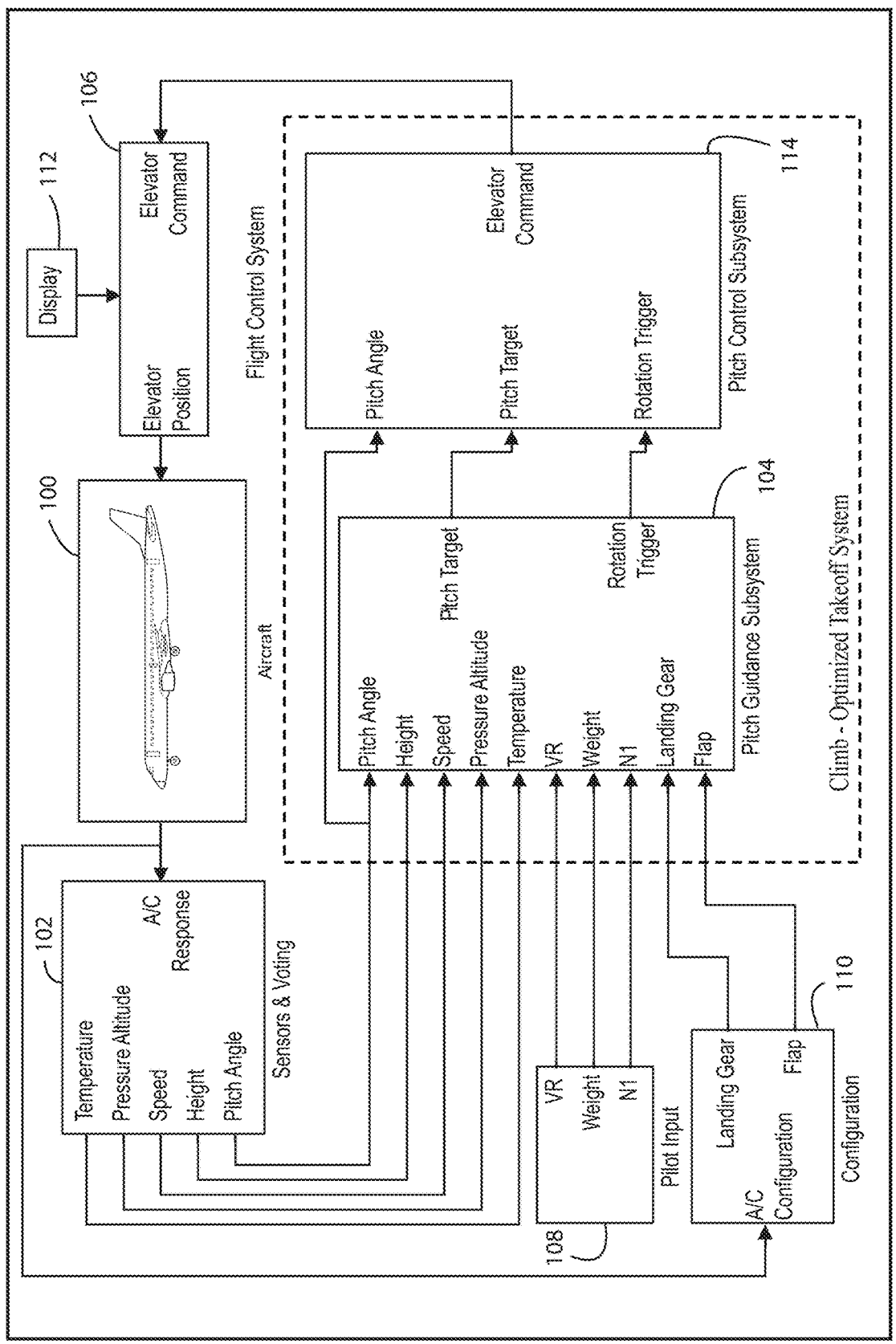
Figure 5: Example Auto Takeoff System Diagram

OPTIMIZED TRAJECTORY TO NOISE IMPROVEMENT WITH AUTO-TAKEOFF

CROSS-REFERENCE TO RELATED APPLICATIONS

None.

STATEMENT REGARDING FEDERALLY SPONSORED RESEARCH OR DEVELOPMENT

None.

FIELD

The technology herein relates to performance, noise abatement and aircraft automation.

BACKGROUND

The advent of jet engines in aviation increased the airplanes cruise velocities as well as the payload capacity per flight, which is very interesting from the standpoint of the operators. On the other hand, the jet engine produces more noise than its predecessors. With the increasing awareness of society and regulation agencies about the environmental impacts of aviation, especially in the areas located closer to airports, the regulation for noise emission certification has become more and more restrictive.

The example non-limiting technology herein provides methods and systems for the optimization of the trajectory during takeoff to minimize the noise generation during operational departure procedures and consequently reduce the associated noise footprint in the vicinity of airports, as an automatized noise abatement procedure.

In addition to the regulation for noise emission certification, there are some important airports around the world that have specific operation regulation for noise emission. The London City Airport (LCY) is an emblematic example. It was created as a part of a plan for revitalization of Royal Docks in London Borough of Newham, a very populous area in the east of the City of London.

Since its creation, the airport has a formal contract to the local community which establishes a limited number of operating hours and also a limit for annual average level of noise emission during take-off and landing for operating type airplanes. The punishment for not attaining these limits may be the banishment of the type of aircraft from operating in this airport.

The rule for Flyover Noise at LCY Airport is that a certain aircraft type shall not exceed the average level of 94.5 PNL in a year. Here, PNL means Perceived Noise Level. Perceived noisiness is defined as a measure of how unwanted, objectionable, disturbing or unpleasant the sound is. The PNL scale allows for different human sensitivity to different frequencies. PNL is determined by a combination of measurement and mathematical calculation, involving spectral analysis. PNL is calculated in a standard manner according to ICAO Annex 16 based on signals from microphones operating at the airport. See Environmental Technical Manual Volume I "Procedures for the Noise Certification of Aircraft" of the International Civil Aviation Organization Committee on Aviation Environmental Protection, SGAR 1 (CAEP9 Steering Group 3 approved revision) Based on Doc 9501, Volume I, First Edition), incorporated herein by reference.

To comply with such restrictive rules, the manufacturers have to create specific procedures for pilots to follow during takeoff and landing at this and other airports. For example, the National Business Aviation Association recommends the following noise abatement procedures:

NBAA-Recommended Noise Abatement Departure Procedure with High-Density Airport Option 1. Climb at maximum practical rate not to exceed V2+20 KIAS (maximum pitch, attitude 20 degrees) to 1,000 feet AAE (800 ft. AAE at high-density-traffic airports) in takeoff configuration at takeoff thrust.

2. Between 800 and 1,000 feet AAE, begin acceleration to final segment speed (VFS or VFTO) and retract flaps. Reduce to a quiet climb power setting while maintaining a rate of climb necessary to comply with IFR departure procedure, otherwise a maximum of 1,000 FPM at an airspeed not to exceed 190 KIAS, until reaching 3,000 feet AAE or 1,500 feet AAE at high-density-traffic airports. If ATC requires level off prior to reaching NADP termination height, power must be reduced so as not to exceed 190 KIAS.

3. Above 3,000 feet AAE (1,500 feet at high-density airports) resume normal climb schedule with gradual application of climb power.

4. Ensure compliance with applicable IFR climb and airspeed requirements at all times.

In the case of a certain aircraft type during takeoff, Embraer has created a procedure that consists of a sequence of manual actions that the pilot should perform with a high level of accuracy during takeoff to follow an optimized trajectory to noise. Some of these actions are listed below:

Rotation of the aircraft exactly @ $V_R$ (rotation velocity)
Pitch rate q at or above 5 deg/s
Pitch θ final≥18 deg
Appropriate Thrust Management.

There is usually no flight instrument available to the pilot that shows pitch rate directly. Therefore, it typically falls solely to the pilot's ability to control this behavior based on airmanship and experience. Also worth mentioning is that aircraft dispatch characteristics such as Center of Gravity position and inertias have a first order relevance on this behavior, making it utterly impossible for a human being to predictively control the phenomena with a high degree of accuracy.

If the pilot performs at least one of these actions without the required accuracy, the result in perceived noise level is compromised. For instance, if the rotation is delayed until after $V_R$ (as FIG. 1 shows), the airplane will fly over the microphone at a lower altitude and a higher noise will be detected.

An intrinsic characteristic of a procedure consisting of manual actions that demand such level of accuracy is that it can be very hard to follow consistently. FIG. 2 shows a collection of real takeoff flightpaths of a particular fleet of a certain aircraft type operating at LCY Airport. The comparison between the best and the worst performed takeoff flightpaths (for TOW between 43000 kg and 43500 kg) reveals a difference of 400 ft in height over the position of noise measurement microphones. This difference in height corresponds to an increase in the perceived noise level of approximately 2 PNdB.

The dispersion in the takeoff flightpaths shown in FIG. 2 can be explained by the dispersion in the main takeoff parameters related to the optimized trajectory to noise reduction due to manual execution of noise abatement procedure. FIG. 3a shows a distribution of aircraft's real velocity at the moment of rotation versus $V_R$ and indicates a tradeoff between real velocity at the moment of rotation and $V_R$ (the optimum velocity value for rotation). There is loss of safety if rotation occurs significantly below $V_R$, and noise increase if rotation occurs significantly above $V_R$. FIG. 3b shows a comparison between real data and optimum data of pitch rate q, and indicates a similar Gaussian distribution. FIG. 3c shows a similar Gaussian distribution in a comparison of real pitch data and optimum pitch θ data. Most takeoffs fall within acceptable noise abatement optimum $V_R$ (FIG. 3a), but the same does not occur with respect to pitch and pitch rate (FIG. 3b and FIG. 3c) which are performed well below the optimum values. In instances of strict noise abatement enforcement such as the City of London airport, these outliers could cause the airport to prohibit certain types, models or classes of aircraft from using the airport, decreasing the value of those aircraft for manufacturers, owners and operators. Additionally, such outlier operations could cause annoyance to dwellings, businesses and others on or near the takeoff flight path.

The dispersion in takeoff parameters, especially those related to flight path, thus affects directly the average of Perceived Noise Level and consequently affects both the relationship of the airport with the local community and the viability of the operation of a certain aircraft type at the airport. For example, FIGS. 4a and 4b show that the variation of a mere 1 deg/s in Pitch Rate q substantially affects the Perceived Noise Level.

While much work has been done in the past, further improvements are possible and desirable.

BRIEF DESCRIPTION OF THE DRAWINGS

The following detailed description of exemplary non-limiting illustrative embodiments is to be read in conjunction with the drawings of which:

FIG. 1 shows delayed rotation effect: when the rotation is delayed, the aircraft flies over the microphones at a lower altitude and, consequently, the microphones detect higher noise.

FIG. 2 shows takeoff flightpaths at London City Airport: although there is a very detailed and clear procedure for reduction of perceived noise level during takeoff, the real flightpaths show that during operation is very difficult to maintain consistency with this procedure.

FIG. 3a shows comparison between real data and optimum data of $V_R$: this figure shows that there is a dispersion of 10 kts in terms of $V_R$.

FIG. 3b shows comparison between real data and optimum data of pitch rate q: the real data shows that the pilots consistently perform the rotation of the airplane below the recommended pitch rate.

FIG. 3c shows comparison between real data and optimum data of pitch θ: there is clearly a lack of operational consistency in terms of pitch, which brings a penalty in terms of Perceived Noise Level when the aircraft is flying over the microphones.

FIGS. 4a and 4b show pitch rate effect in perceived noise level: if the rotation is performed one degree per second below the recommended pitch rate, there is a penalty of almost 2 dB in terms of Perceived Noise Level.

FIG. 5 shows an example non-limiting control system.

DETAILED DESCRIPTION OF EXAMPLE NON-LIMITING EMBODIMENTS

Figure 6:
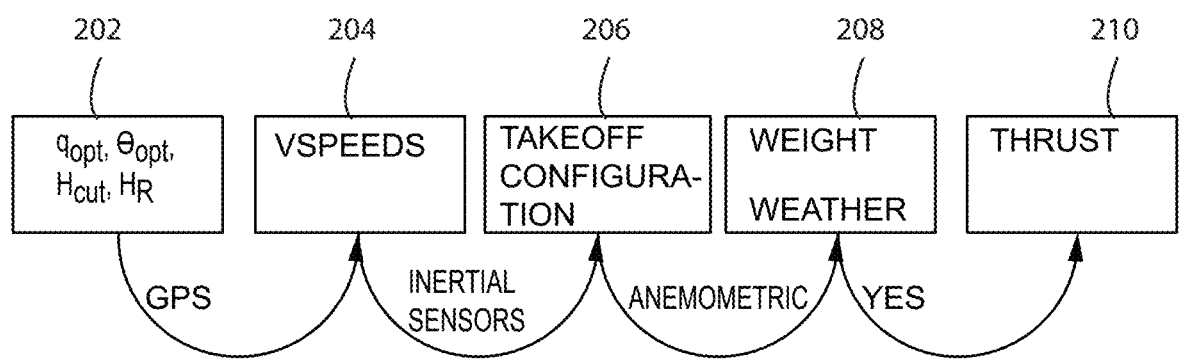
FIG. 6 shows an example non-limiting parameter development.

Example non-limiting embodiments provide method and apparatus to optimize the takeoff trajectory to minimize Perceived Noise Level and a system to automatically perform all the actions to takeoff the airplane and assure that its real takeoff trajectory is compliant with the takeoff trajectory optimized. Such example non-limiting embodiments eliminate variability of trajectory through automation of pilot's actions during takeoff and assurance of an optimum trajectory. Example non-limiting embodiments also provide for simultaneity of actions and the changing of aerodynamic configuration during takeoff Example Non-Limiting System Architecture FIG. 5 shows an overview of an example non-limiting auto-takeoff system and the interfaces with other aircraft systems. As shown in FIG. 5, an aircraft 100 includes conventional sensors and voting arrays 102 that monitor parameters such as temperature, pressure altitude, speed, height and pitch angle and provide sensed (voted) values to pitch guidance subsystem 104. The sensor/voting array 102 is thus capable of measuring the response of the aircraft to control inputs from flight control system 106 such as elevator position. The pitch guidance subsystem 104 also receives pilot input 108 including $V_R$, weight and Ni. Additionally, the pitch guidance subsystem 104 receives landing gear and flap information from a configuration subsystem 110. Pitch guidance subsystem 104 thus obtains information from aircraft sensors 102 and pilot input 108 devices, while the output of the auto-takeoff system is transmitted to the flight control system 106. For a pitch guidance indication, the pitch target is transmitted also to the aircraft display 112.

Pitch control subsystem 114 receives pitch angle, pitch target and rotation trigger information from pitch guidance subsystem 104. The pitch control subsystem 114 applies noise-optimized takeoff calculations to provide the aircraft with capability to calculate and, with an automatic takeoff option, to follow an optimum takeoff pitch guidance as a function of the actual takeoff radiant (in the conditions considered for dispatch) constrained by the aircraft geometric limitations, if applicable.

Figure 7:
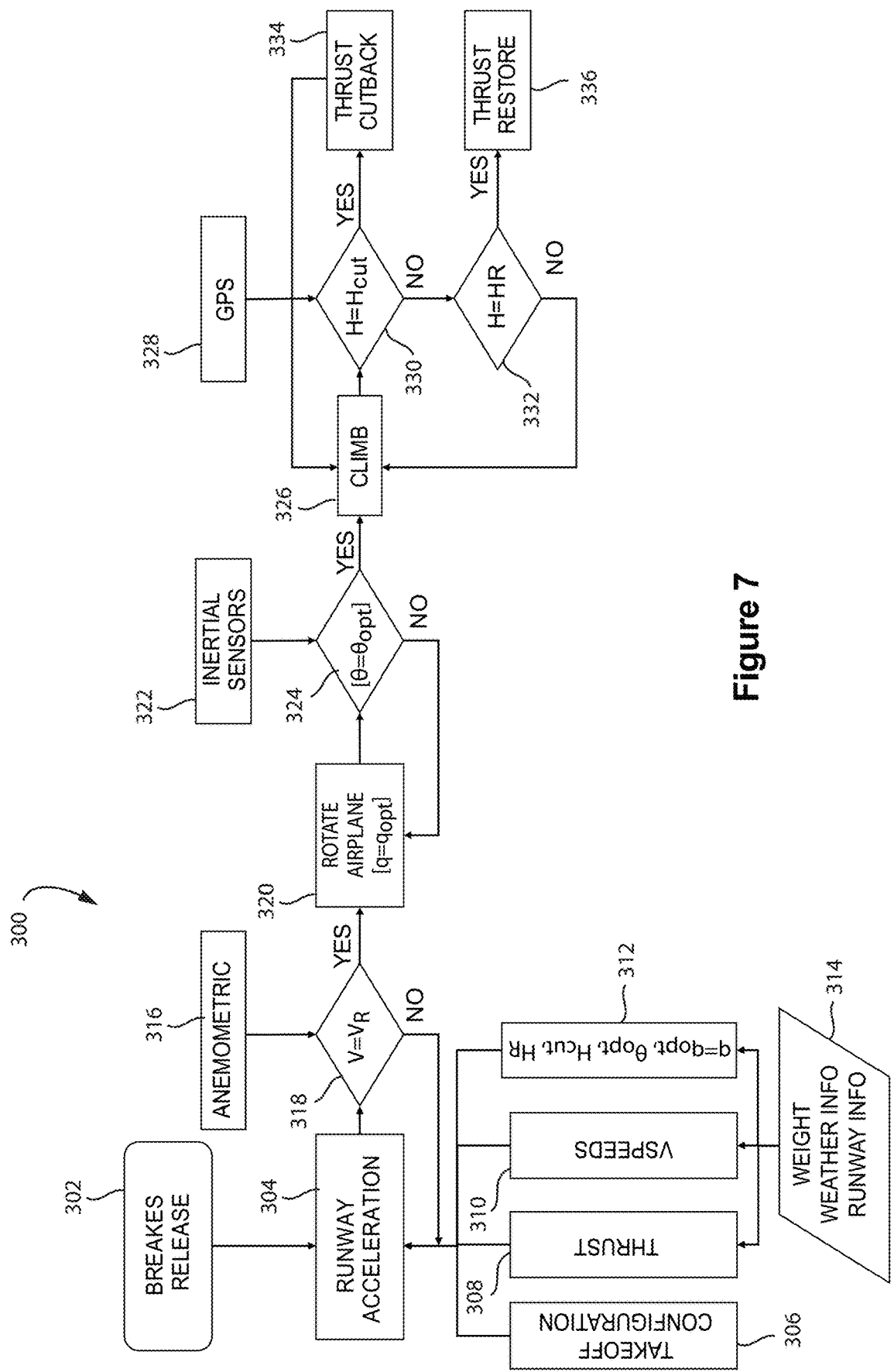
FIG. 7 shows a schematic of an example non-limiting data evaluation and system decision process.

Pitch guidance subsystem 104 and pitch control subsystem 114 may each comprise at least one processor coupled to non-transitory storing instructions the processor executes to perform program controlled operations such as shown in FIG. 7. Other implementations such as hardware, hybrid hardware and software, application specific integrated circuit, etc., are also possible.

In one example non-limiting embodiment, the pitch guidance subsystem 104 uses the estimated weight, weather parameters (temperature and wind) and airport data (runway information) to calculate the related thrust and V-speeds. With parameter inputs (weight, thrust, takeoff configuration—flaps position—and V-speeds), an optimum pitch rate and/or an optimum pitch is/are calculated to provide the optimum trajectory after lift-off, as well as, an optimum altitude for cutback and for thrust restoration are provided, when appropriate. In some embodiments, the FIG. 5 control system includes additional outputs used to directly control such jet engine thrust cutback and restoration.

FIG. 6 shows an example non-limiting multi-stage processing performed by the FIG. 5 control system. In FIG. 6, block 202 indicates the control system being programmed with optimal parameters such as optimal pitch rate ($q_{OPT}$), optimal pitch ($θ_{OPT}$), optimal thrust cutback height ($H_{CUT}$), and optimal thrust restoration height ($H_R$) after thrust cutback. The control system uses a GPS (geo-positioning system) to determine V speeds such as rotation speed $V_R$ (block 204). The control system uses inertial sensors (e.g., gyrosensors, accelerometers, etc.) to determine aircraft take-off configuration (block 206). The control system uses external sensors such as wind (anemometric) sensors to determine weather conditions including wind speed (block 208). The control system uses all of these parameters to control thrust cutback and restoration (block 210).

FIG. 7 shows how with these parameters calculated, the control system will start controlling the takeoff procedures after the brakes are released (block 302) and will perform the following actions:

- Runway acceleration is determined and controlled based on parameters including takeoff configuration 306, thrust 308, VSPEEDS 310 and the initial parameters described in block 202 above, based on weight, weather information and runway information (blocks 304-314);
- The Speed is monitored (e.g., first by a GPS system and then by an anemometric sensor 316 when the aircraft has acquired sufficient velocity for the anemometric system to function) until the speed reaches the $V_R$ value (decision block 318);
- When Speed=$V_R$, the airplane is immediately rotated (e.g., by controlling the control surfaces) with optimum pitch rate $q=q_{OPT}$ (block 320);
- Pitch θ is monitored using inertial sensors 322 until it reaches optimum pitch value $\theta_{OPT}$ (block 324);
- Optimum pitch $\theta_{OPT}$ is captured and maintained (the control system controls the surface controls while monitoring aircraft attitude via the inertial sensors to maintain optimum pitch angle and pitch rate);
- The aircraft is controlled to climb at optimum pitch and pitch rate (block 326);
- Altitude is monitored (e.g., by GPS or other altitude sensor in block 328) until the aircraft reaches an optimum altitude for thrust cutback (H=$H_{CUT}$) (block 330);
- Cutback of thrust is performed for noise abatement, by the control system automatically controlling the jet engines to reduce thrust and slow climb once a safe altitude has been reached to do so (block 334);
- Altitude continues to be monitored until the aircraft reaches an optimum altitude for thrust restoration (H=$H_R$) (block 332) (i.e., once the control system determines the aircraft has climbed to a sufficient altitude such that thrust cutback for noise abatement purposes is no longer needed, it may control the engines to restore increased thrust);
- Thrust is restored to Climb Thrust (block 336).

The entire process is transparent to the pilot. The pilot does not need to perform any procedure, except for setting up the function for perceived noise optimization. This will reduce the pilot workload in a very demanding flight phase, as well as produce a more consistent operation.

Besides that, the automation of takeoff procedures brings the possibility of simultaneity of actions and the aerodynamic configuration changes during takeoff climb. As a consequence, the optimized trajectory will result in even lower perceived noise levels than the perceived noise level for an optimum trajectory based on non-simultaneous procedures.

The simultaneity of some actions like rotating the airplane exactly at $V_R$ with a pitch rate at or above 5 deg/s and capturing pitch at or above 18 deg would bring substantial improvement to the optimum trajectory for Perceived Noise Level in Flyover.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A system for automatic consistent noise abatement takeoff of an aircraft comprising:
   at least one sensor; and
   at least one processor operatively coupled to the at least one sensor, the at least one processor being configured to perform the following:
   (a) determine when the aircraft reaches rotation velocity VR and automatically control the aircraft to rotate exactly at the rotation velocity VR at a predetermined pitch rate q optimized for noise abatement;
   (b) after rotation, monitor attitude and pitch of the aircraft and automatically control the aircraft to attain and maintain a pitch angle θ optimized for noise abatement; and
   (c) after rotation, monitor altitude of the aircraft and automatically control the aircraft to cutback on thrust during climb at a predetermined altitude HCUT to abate noise.

2. The system of claim 1 wherein the at least one sensor comprises an inertial sensor and an anemometric sensor.

3. The system of claim 1 wherein the at least one processor is further configured to automatically control the aircraft to restore thrust once the aircraft attains a restoration altitude HR.

4. The system of claim 1 wherein the processor is further configured to automate takeoff procedures to provide simultaneity of actions and aerodynamic configuration changes during takeoff climb so that as a consequence, an optimized trajectory of the aircraft results in lower perceived noise levels than the perceived noise level for an optimum trajectory based on non-simultaneous procedures.

5. The system of claim 1 wherein the processor is configured to make said control transparent to a pilot such that the pilot does not need to perform any procedure, except for setting up a function for perceived noise optimization.

6. A system for automatic consistent takeoff noise reduction of an aircraft comprising:
   at least one sensor; and
   at least one processor operatively coupled to the at least one sensor, the at least one processor being configured to perform the following:
   (a) determine when the aircraft reaches rotation velocity VR and automatically control the aircraft to rotate exactly at the rotation velocity VR with a pitch rate optimized for noise abatement;
   (b) monitor trajectory and pitch of the aircraft;
   (c) in response to the monitoring, control the trajectory according to an optimized noise reducing trajectory;
   (d) in response to the monitoring, control the pitch of the aircraft according to an optimized noise reducing pitch; and
   (d) in response to the monitoring, upon the achievement of a predefined, optimized point in the trajectory, perform a thrust cutback procedure thus abating noise.

7. A system for automatic consistent takeoff noise reduction of an aircraft comprising:
at least one sensor; and
at least one processor operatively coupled to the at least one sensor, the at least one processor being configured to perform the following:
(a) determine when the aircraft reaches rotation velocity VR and automatically control the aircraft to rotate exactly at the rotation velocity VR at an optimized pitch rate;
(b) monitor trajectory and pitch of the aircraft;
(c) in response to the monitoring, control the trajectory according to an optimized noise reducing trajectory;
(d) in response to the monitoring, control the pitch according to an optimized noise reducing pitch; and
(e) in response to the monitoring, perform an optimal thrust management automatically in order to obtain noise abatement.

8. A method for automatic consistent noise abatement takeoff of an aircraft comprising:
measuring with at least one sensor;
with at least one processor, in response to the measuring, automatically determining when the aircraft reaches rotation velocity VR and automatically controlling the aircraft to rotate exactly at the rotation velocity VR with a predetermined pitch rate;
in response to the measuring, the at least one processor automatically monitoring attitude and pitch of the aircraft and automatically controlling the aircraft to attain and maintain a pitch optimized for noise abatement;
the at least one processor monitoring altitude of the aircraft; and
in response to the measuring, the at least one processor automatically controlling the aircraft to cutback on thrust during climb to a predetermined altitude HR to abate noise.

9. An aircraft comprising:
engines;
control surfaces;
a pitch guidance subsystem that generates pitch angle, pitch target and rotation trigger information; and
a pitch control subsystem operatively coupled to at least the control surfaces and the pitch guidance subsystem, the pitch control subsystem being structured to receive the pitch angle, pitch target and rotation trigger information from the pitch guidance subsystem and perform noise-abatement takeoff calculations to provide the aircraft with capability to calculate and, with an automatic takeoff option, to automatically control at least one control surface of the aircraft so the aircraft follows noise-abatement takeoff pitch guidance as a function of the actual takeoff radiant constrained by any applicable aircraft geometric limitations, including rotating at a predetermined pitch rate and thereafter maintaining a predetermined pitch angle.

10. The aircraft of claim 9 wherein in response to measuring aircraft pitch, the pitch control subsystem determines when the aircraft reaches rotation velocity VR and automatically controls the aircraft to rotate exactly at the rotation velocity VR.

11. The aircraft of claim 9 wherein the pitch control subsystem is configured to monitor attitude of the aircraft and automatically controls the aircraft to attain and maintain a takeoff pitch angle and pitch rate optimized for noise abatement.

12. The aircraft of claim 9 wherein the pitch control subsystem is configured to monitor altitude of the aircraft and automatically control the engines to cut back on thrust during climb to a predetermined altitude to abate noise.

* * * * *